United States Patent
Bushey et al.

(10) Patent No.: US 9,197,752 B2
(45) Date of Patent: *Nov. 24, 2015

(54) METHOD FOR DESIGNING AN AUTOMATED SPEECH RECOGNITION (ASR) INTERFACE FOR A CUSTOMER CALL CENTER

(71) Applicant: AT&T Intellectual Property I, L.P., Atlanta, GA (US)

(72) Inventors: Robert R. Bushey, Cedar Park, TX (US); Benjamin A. Knott, Round Rock, TX (US); John M. Martin, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,310

(22) Filed: Jun. 23, 2014

(65) Prior Publication Data

US 2014/0314228 A1  Oct. 23, 2014

Related U.S. Application Data

(63) Continuation of application No. 13/681,970, filed on Nov. 20, 2012, now Pat. No. 8,761,381, which is a continuation of application No. 12/326,630, filed on Dec. 2, 2008, now Pat. No. 8,315,360, which is a continuation of application No. 10/852,342, filed on May 24, 2004, now Pat. No. 7,460,650.

(51) Int. Cl.
| | |
|---|---|
| *H04M 3/00* | (2006.01) |
| *H04M 3/523* | (2006.01) |
| *G10L 15/18* | (2013.01) |
| *H04M 3/493* | (2006.01) |
| *G10L 15/183* | (2013.01) |

(52) U.S. Cl.
CPC ......... *H04M 3/5232* (2013.01); *G10L 15/1822* (2013.01); *H04M 3/493* (2013.01); *G10L 15/183* (2013.01); *H04M 2201/40* (2013.01); *H04M 2203/355* (2013.01)

(58) Field of Classification Search
CPC ............................ H04Q 3/0012; H04M 3/523
USPC .......................................... 379/272, 265.02
See application file for complete search history.

(56) References Cited

U.S. PATENT DOCUMENTS

| | | | |
|---|---|---|---|
| 5,926,539 A | 7/1999 | Shtivelman | |
| 6,134,530 A | 10/2000 | Bunting et al. | |
| 6,480,599 B1 | 11/2002 | Ainslie et al. | |
| 6,584,192 B1 | 6/2003 | Agusta | |
| 6,823,054 B1 | 11/2004 | Suhm et al. | |
| 2002/0032564 A1 | 3/2002 | Ehsani et al. | |
| 2002/0196277 A1* | 12/2002 | Bushey et al. | 345/745 |
| 2002/0199182 A1* | 12/2002 | Whitehead | 725/1 |
| 2003/0204404 A1 | 10/2003 | Weldon et al. | |
| 2006/0165066 A1 | 7/2006 | Campbell et al. | |

* cited by examiner

*Primary Examiner* — Simon King
(74) *Attorney, Agent, or Firm* — Jackson Walker L.L.P.

(57) ABSTRACT

A method of designing a customer interface for a service center, such as an automated speech recognition (ASR) self-service center. Customer activity to an existing service center is monitored, providing customer model, which includes a collection of customer tasks. These tasks are assigned to action-object pairs, which are further assigned to routing destinations. Dialog modules are designed, based on the customer model data, including disambiguation dialogs.

20 Claims, 4 Drawing Sheets

| ROUTING ACTION | ROUTING OBJECT | DESTINATION (CALL CENTER) |
| --- | --- | --- |
| ACQUIRE | BASIC | ORDER |
| ACQUIRE | DIALUP | ORDER |
| ACQUIRE | DSL | ORDER |
| ACQUIRE | LONG DISTANCE | CUSTOMER RETENTION |
| CANCEL | BASIC | DISCONNECT GROUP |
| FIX | BASIC | REPAIR |
| INQUIRE | ACCOUNT | CUSTOMER RETENTION |
| INQUIRE | BALANCE | BILLING |
| INQUIRE | LONG DISTANCE | BILLING |
| MOVE | BASIC | ORDER |
| PAY | BILL | BILLING |

| ITEM | ACTION-OBJECT | PERCENT | CUMULATIVE |
|---|---|---|---|
| 1 | INQUIRE-BALANCE | 7.7% | |
| 2 | PAY-BILL | 4.0% | |
| 3 | ACQUIRE-BASIC | 3.1% | |
| 4 | MOVE-BASIC | 3.1% | 17.9% |
| 5 | INQUIRE-BILL | 2.9% | |
| 6 | ACQUIRE-LD | 2.2% | |
| 7 | HTU-OPTIONALSERVICE | 1.9% | |
| 8 | FIX-BASIC | 1.9% | |
| 9 | CANCEL-BASIC | 1.5% | |
| 10 | ACQUIRE-OPTIONALSERVICE | 1.3% | 29.6% |
| 11 | ACQUIRE-DSL | 0.9% | |
| 12 | ACQUIRE-RATEPLAN | 0.8% | |
| 13 | SCHEDULE-PAYMENT | 0.8% | |
| 14 | CHECK-ACQUISITIONSTATUS | 0.7% | |
| 15 | INQUIRE-OPTIONALSERVICE | 0.7% | 33.5% |

*FIG. 3*

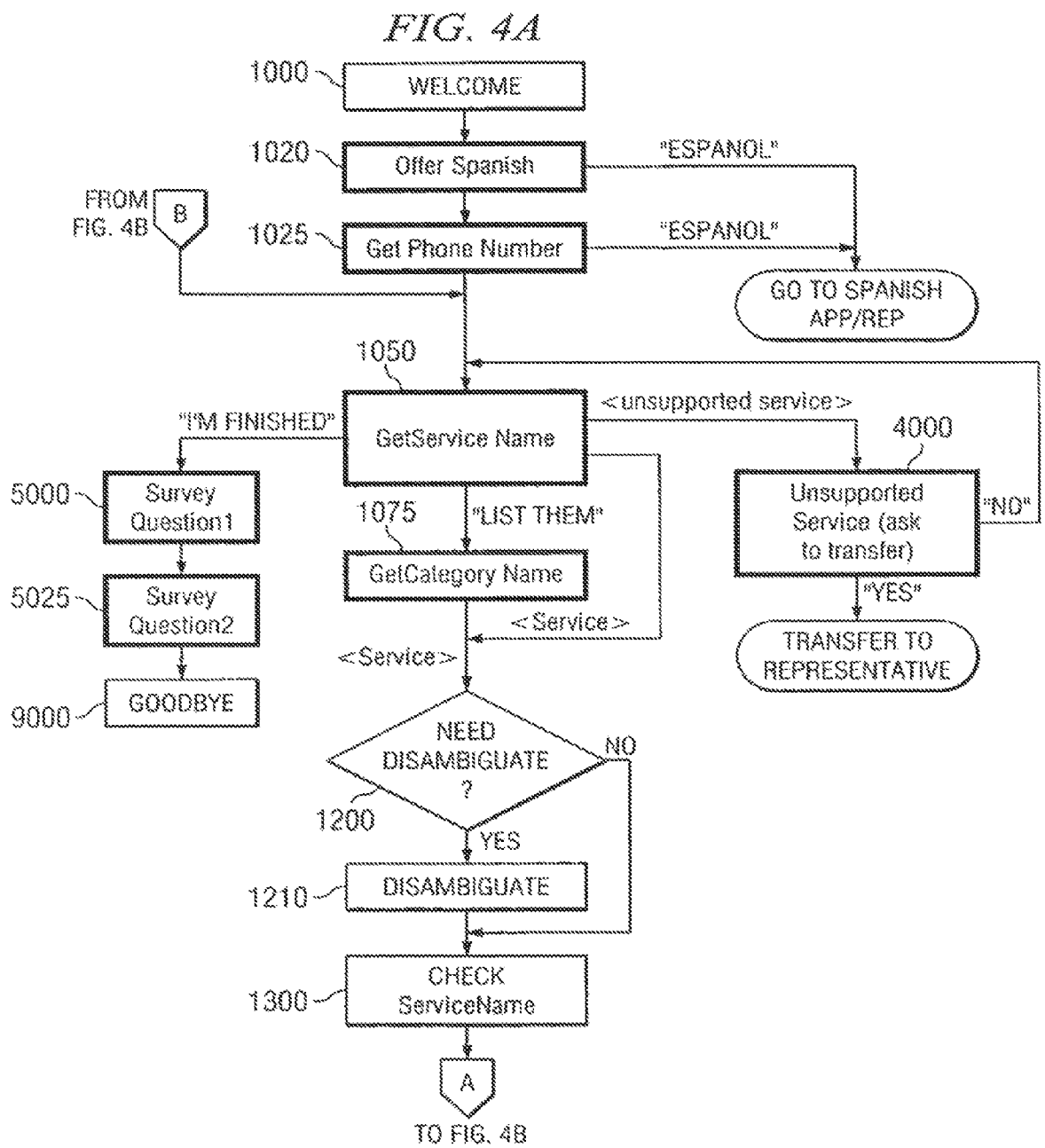

METHOD FOR DESIGNING AN AUTOMATED SPEECH RECOGNITION (ASR) INTERFACE FOR A CUSTOMER CALL CENTER

The present patent application is a continuation of U.S. patent application Ser. No. 13/681,970, filed Nov. 20, 2012 (issuing as U.S. Pat. No. 8,761,381 on Jun. 24, 2014), which is a continuation of U.S. patent application Ser. No. 12/326,630, filed Dec. 2, 2008 (now U.S. Pat. No. 8,315,360), which is a continuation of U.S. patent application Ser. No. 10/852,342, filed May 24, 2004 (now U.S. Pat. No. 7,460,650), the entirety of which are hereby incorporated by reference. Pursuant to 37 CFR §1.78(a)(3), an application data sheet containing a reference to the previously filed applications, unless submitted previously, is submitted contemporaneously herewith.

TECHNICAL FIELD OF THE INVENTION

This invention relates to customer call center services, and more particularly to a method for designing customer interfaces for telephone-based or web-based customer service systems.

BACKGROUND OF THE INVENTION

Customer call centers are increasingly using automated self-service applications. Self-service call center applications are much less expensive than those using service agents. A well designed self-service application can cost as little as 10% as an application using service agents.

Because of this potential savings, today's call center service providers desire to increase the number of self-service calls relative to agent-assisted calls. However, when deciding among various designs for self-service applications, there are considerations in addition to savings. Specifically, the service provider must consider whether, in addition to reducing agent costs, a particular design cars achieve quality of service goals, such as high customer task completion, high customer satisfaction, and short call duration. Conversion of a call center system from agent-assisted to self-service can be accomplished incrementally. The overall goal becomes performing more and more customer tasks with self-service applications, while holding or improving task completion and customer satisfaction.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates Step 106 of the method of FIG. 1.

FIGS. 4A and 4B illustrate a how-to-use customer interface, designed in accordance with the invention.

DETAILED DESCRIPTION OF THE INVENTION

The following invention is directed to a method of designing an interface for an automated customer call center. A feature of the method is that it is directed to making design decisions on the basis of customer data rather than designer opinion. The method is a systematic, data-driven method of interface design that ensures that the resulting customer interface is tailored for the intended user population, resulting in higher customer acceptance and satisfaction.

Customer Interface Design Method

Figures 1, 2:
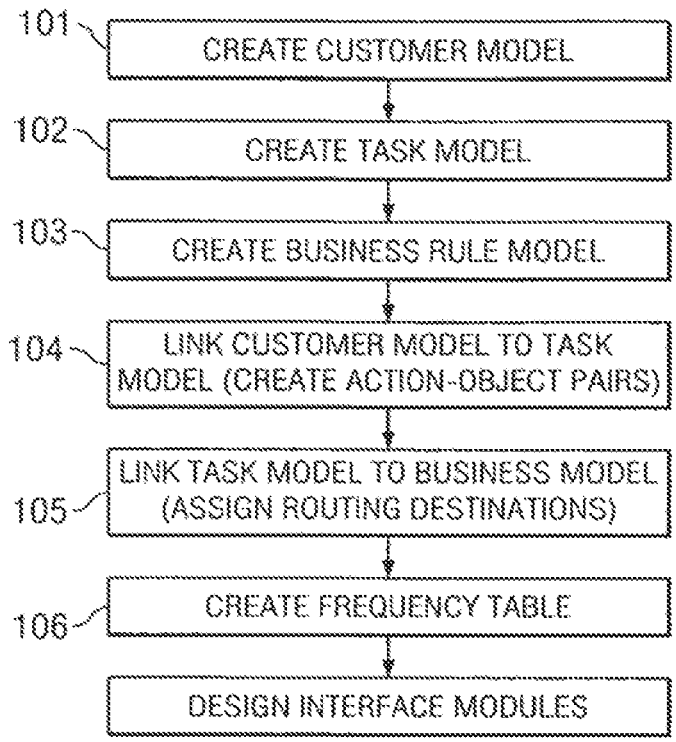
FIG. 1 illustrates a method of designing an interface in accordance with the invention.
FIG. 2 illustrates Steps 104 and 105 of the method of FIG. 1.

FIG. 1 illustrates a method of designing a customer interface in accordance with the indention. The examples set out below in connection with FIG. 1 are examples of a customer interface for routing calls among various call centers of a telephone service provider. The customer interface is to be implemented using automated speech recognition (ASR) techniques.

The same concepts may be applied to designing any customer interface for any type of business enterprise. Furthermore, as explained below, the interface could be for a service agent or a web-based service center, as well as for an automated (ASR) call center, or some combination of agent, ASR, or text entry, interaction between the customer and the business enterprise.

Step 101 is creating a customer model. The model is based on customer tasks, which may be collected by recording opening statements of customers to a service center. For example, opening statements made to a agent could be recorded. Or, customer data could be collected during visits to a web site, via the Internet. Typically, the customer data is collected during customer visits (by telephone or via the Internet) to an "existing" service center (call center or web service site) that is to be updated or enhanced to become a self-service center in accordance with the design method of the present invention.

The customer model can also be used to determine "personas" used in designing interface modules, as described below. For example, customer persona data could be used to determine whether language alternatives should be presented and which language choices should be available. As explained below, customer model data can also be used to determine disambiguation techniques, when customer responses are not immediately indicative of a routing destination.

Step 102 is creating a task model. This model represents a taxonomy, from the customer task list collected in Step 101, of "actions" versus "objects" in a matrix. Some matrix cells will be more frequent in their occurrence than other cells. Some cells are not logical and do not exist in actual customer-call center interactions.

Step 103 is creating a business rules model. This step involves gathering business rules from one or more call centers. These rules may be dispersed in the sense that each call center may modify, to some extent, business rules in accordance with that call center's unique circumstances and location. This model determines where customer calls (by type) are to be routed.

Step 104 is linking the customer model to the task model. In other words, the customer opening statements (from the customer model) collected in Step 101 are assigned to the action-object pairs (from the task model) created in Step 102. Two examples of the results of Step 104 are:

acquire-basic—for customers who wish to order phone service pay-bill—for customers who wish to pay their bill Step 105 is linking the task model to the business rules model. In other words, action-object pairs (from the task model) are linked to routing destinations (from the business rules model). Examples of routing destinations are a call center agent, a queue, a self-service speech recognition application, or the internet.

FIG. 2 is an example of action-object pairs and their routing destinations. In the example of FIG. 2, the routing destinations are ASR systems associated with specific call centers. A single business enterprise might have a number of call centers, such as for billing, customer retention, ordering, how-to-use, returns, etc.

Step 106 is creating an action-object frequency table. Each action-object pair is listed in its order of frequency of use. The list is in descending order of frequency.

FIG. 3 illustrates an example of a portion of an action-object frequency table in accordance with Step 106.

Step 107, is designing ASR dialog modules. Typically, each module is designed in the sequential order of the action-object frequency table list, beginning with the most frequent action-object pairs.

In designing the modules, the persona data acquired in Step 101 may be used to influence various features of the module. Persona may influence the frequency, detail level, and style of dialog between the ASR system and the customer, as well as the wording of prompts. For example, a highly sophisticated customer base might allow for a more terse, brief dialog.

A feature of the interface module design is that customer tasks can have only two alternative routing destinations. A "direct route" destination occurs when there is sufficient information to directly route the call to the correct location. A "further clarification" destination occurs when clarification or further information is needed to route the call.

A first example of "further clarification" routing would occur if the customer said "I have a question about my long distance service". This statement would be handled by a dialog module corresponding to the "Inquire; Long Distance" action-object pair. This dialog module asks: "Is your long distance with X Company?" If the response is "yes", the customer is transferred to the appropriate call center for company x long distance service. If the response is "no", the customer is transferred to a standard pre-recorded message instructing the customer to call their long distance provider.

A second example of "further clarification" routing would occur if the customer said: "I'd like to cancel my service". This statement would be transferred to a Cancel-Basic dialog module. This dialog module asks: "Is this for your basic telephone service?" If the response is "yes", the call is transferred to the Disconnect call center. If the response is "no", appropriate dialog is provided such that the customer can select among services corresponding to various dialog modules. Once the service desired to be cancelled is selected, the selection serves as an entry point to the corresponding module.

Figure 4B:
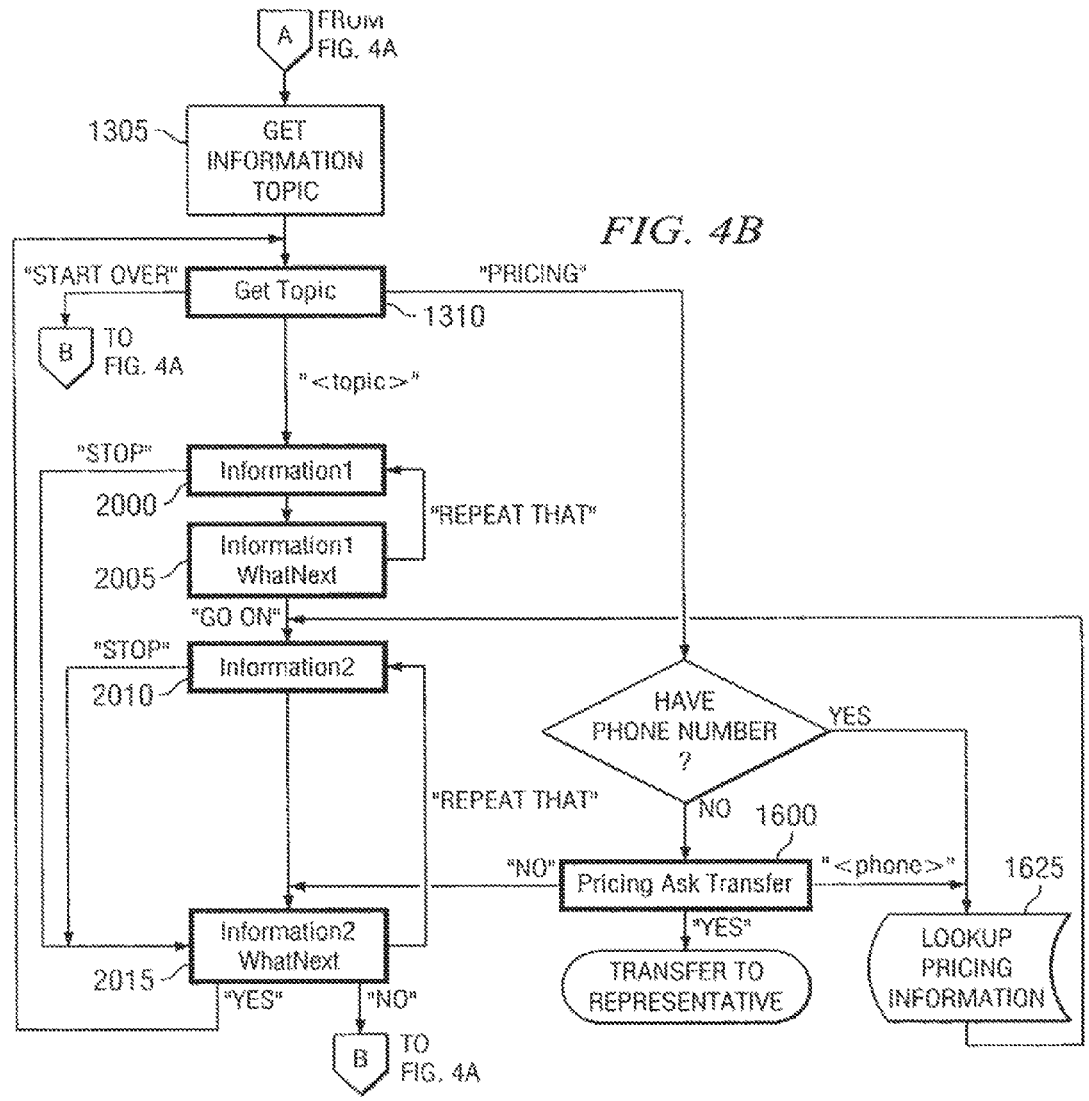

FIGS. 4A and 4B, described below, illustrate examples of dialog modules for a customer interface for a "how-to-use" call center. The common routing destination is the how-to-use call center, and the dialog modules correspond to action-object pairs. The dialog modules of FIGS. 4A and 4B further illustrate various "further clarification" techniques, and various alternatives for disambiguating customer responses.

During implementation of the dialog modules, data is collected to ensure that the customer has a positive experience. Various means exist for gathering data about success rates of voice recognition, call routing, and overall customer satisfaction.

In other embodiments, the above-described interface design method could be used to design a web-based interface. In this embodiment, the customer would interact with the web interface by text (keyboard) entry, voice, or some combination of both. As Internet, telephonic, and two-way visual communications become increasingly intertwined, the application of the invention will similarly be applicable to various combinations of live, ASR, and web-based communication media.

How-to-Use Customer Interface Example

FIGS. 4A and 4B illustrate an example of a customer interface designed using the above-described interface design method. The interface is a "how to use" (HTU) interface for an ASR (self-service) customer call system. More specifically, the example of FIGS. 4A and 4B is an HTU interface for telephone services, on behalf of a telephone service provider.

As explained below, the HTU interface comprises a number of dialog modules, each activated in response to a routing decision. Each can be associated with an action-object pair, using the techniques described above.

As explained below, the system provides a caller with an interactive self-service series of verbal prompts, voice recognition entry points, and messages, the combination of which provide the caller with the desired information about how to use a selected service. Once a caller has selected a service of interest, then a topic of interest, the system provides the appropriate instructions.

As explained below in connection with FIG. 5, the dialog of FIGS. 4A and 4B is implemented using computer hardware, which is programmed in accordance with the process steps described below. The HTU system allows callers to easily access instructions for a variety of services or products within a single phone call by using speech input. The system uses a combination of natural language and directed dialog elements, allowing callers to retrieve instructions through several different paths. Specifically, callers can identify a topic of interest in three ways: by saying the name of the service or product, by selecting the topic from a menu, or by verbally describing what the service or product does in the caller's own words. This approach is achieved by using both statistical language models and grammar-based recognition techniques.

Although the dialog is especially useful for voice recognition of voice responses from the caller, it also recognizes keypad input. In some steps, keypad input is requested by prompting, such as "Enter 1 for ...." or "Enter your area code and phone number". In general, each of the caller's responses described herein could be substituted with a keypad entry, and DTMF recognition used rather than voice recognition.

Step 1000 is a Welcome state. It is a play-prompt state, and like the other play-prompt states described herein, it plays a waveform, or a series of waveforms, to the caller who hears the waveforms as a spoken message. As an example of a welcome play-prompt, the caller may hear, "Welcome to the How to Use Guide for your phone services".

Step 1020 is an Offer Spanish interaction dialog module. Like the other interaction states described herein, Step 1020 prompts the caller for input. Interaction states also handle default timeout and retries, and typically continue to a next state upon a successful voice recognition.

An example of an Offer Spanish prompt is: "Para continuar en Espanol por favor oprima el uno". If the caller enters "1", the input is recognized as a DTMF signal and the call is transferred to a Spanish version of the dialog. After a pause, and if no DTMF signal is received, the dialog proceeds to Step 1025.

Step 1025 is a Get Phone Number interaction dialog module. Step 1025 typically follows Step 1020. An example of the message played in Step 1025 is: "I'll help you find out how to use any of the phone services we provide for our residential customers. To get started, I'll need your area code and home phone number. You can either say it or enter it."

The caller then responds by speaking or entering a number. If a number is recognized, the caller is thanked and the dialog proceeds to Step 1050. If no number is recognized, various timeouts and retry messages are delivered, and upon failure of these, the dialog is exited.

Step 1050 is a Get Service Name interaction dialog module, and typically follows Step 1025. It may also be entered from Step 1310, Step 2015, or Step 4000, explained below.

When entering from Step 1025, an example of a message to the caller is: "Now, please tell me which phone service you'd like to find out about. [pause] To hear your choices, say list them".

Natural language techniques are used so that the caller may freely speak the names of services or describe them in natural language. If the caller responds by naming or describing a service, the dialog proceeds to Step 1200. If the caller responds by speaking "List them", the dialog proceeds to Step 1075.

If the caller has entered Step 1050 from Step 2015 or from Step 4000, the dialog speaks a message such as "If you're finished hearing about phone services, say "I'm finished". [pause] Otherwise, . . . . " If the caller speaks "I'm finished", the dialog proceeds to Step 5000, explained below. If the caller does not say "I'm finished", the dialog proceeds as when entering from Step 1025.

Natural language techniques are also used to recognize when the caller has named an unsupported service. If the caller names an unsupported service, the dialog proceeds to Step 4000. Step 4000 is a process whereby the system recognizes a number of unsupported services. For example, if the caller speaks "discount packages", the system responds with a message such as: "I'm sorry. Right now, I don't have any information about discount packages. If you want more information about this topic, you'll need to speak with a representative who can help. Would you like me to transfer you now?". If the caller speaks "Yes", the caller is transferred. If the caller speaks "No", the caller returns to Step 1050, hears an appropriate message, and is given another opportunity to select a service.

Step 1075 is a Get Category Name interactive dialog module, performed if the caller has requested a list in Step 1050. An example of a message that the caller hears is: "I have the services grouped into categories based on what each service does. I'll read the categories, and when you hear the one you want, just say it. Call Answering, Caller Identification, Call Forwarding, Call Screening, Three-way Calling, Automatic Dialing, Personalized Ring, Local Plus." The caller may then speak the name of the service category, and the dialog proceeds to Step 1200.

After the message of Step 1075, the caller is offered various retries and timeouts if there is no response or the response is not understood. Also, after a category name is spoken, the caller receives a confirmation message such as "Automatic dialing. Is that correct?"

Step 1200 is a Disambiguation Check internal decision step. If the caller has selected a service category having more than one type of service, it may be necessary to ask an additional question to determine the specific service name. Step 1200 determines whether to continue with the call dialog or to first go to a disambiguation state.

The disambiguation check of Step 1260 depends on which service the caller has selected. Some categories have only one associated service, and need no disambiguation. For those services, the dialog proceeds to Step 1300. However, other categories have more than one associated service. In this case, the dialog proceeds to Step 1210.

Step 1210 is a disambiguation process. For example, if the caller has selected the category of Automatic Dialing in Step 1050 or Step 1210, the caller might hear the following message: "There are four services that can automatically dial a number for you. Say "Auto Redial, Call Return, Speed Calling, Direct Reply, or say Help for a brief explanation of each". The caller's response is recognized as the selected service of interest.

Step 1300 is a Check Service Name internal decision step. This state determines which of the various services the caller has asked for in Step 1050 or Step 1210, and links to a dialog module associated with that service.

Step 1310 is playing the dialog module linked in Step 1300. Each dialog module has a message that briefly describes its associated service and lists topics associated with that service.

For example, if the caller has selected the Call Notes service, the caller hears the following message: "Call Notes voicemail records a message from callers when your phone is busy or you don't answer the call. To pick a different service, say Start over. [pause] There is also a related service called Call Notes Plus, which adds a few additional features. To find out about that, say Call Notes Plus. [pause] I have several topics related to Call Notes—thirteen in fact. I'll start reading the first set of topics, and when your hear the one you want, just interrupt me and say it. [pause] Here are the first four topics. Setup, retrieve messages, change number of rings, change passcode. [pause] Was it one of these?" If the caller responds, with "Yes" or the topic name, the dialog proceeds to Step 2000. If the caller responds "No", the dialog continues with additional topic selections.

As with other interactive steps, each of the dialog modules of Step 1310 provides the caller with various timeout and retry options, and with a confirmation message after a topic is selected. The caller may also be given an option to speak "Start over" and return to Step 1050. During or after the playing of the dialog module, the caller may say "Repeat that" to have the topics of that dialog module repeated.

Services having numerous topics may have their dialog module divided into parts, so that the caller may hear only a portion of the topics in each part of the dialog module. The example above, listing the first four topics for Call Notes is an example of such a service. The partitioning of the topics permits the dialog module to prompt for and receive the caller's request to "start over" or "Repeat that."

A feature of Steps 1050, 1075, and 1310 is that services and topics are presented to the caller in frequency order. That is, the most frequently requested services and topics ere offered to the caller first.

In Step 1310, one of the available topics may be a Pricing topic. Because pricing may depend on the caller's service location, if the caller selects the pricing topic, it is next determined whether the caller's phone number has been obtained in Step 1025.

Step 1625 is performed if the caller has selected a Pricing topic, and if the caller's phone number has been entered and recognized. In Step 1625, a database is queried and appropriate pricing information is accessed and reported to the caller. The dialog then proceeds to Step 2010.

Step 1600 is an interactive dialog module, performed if the caller has selected a Pricing topic and the caller's phone number has not been entered or recognized. In Step 1600, an example message to the caller is: "To get accurate pricing information, I'll need to transfer you to an SBC representative who can help. Would you like me to transfer you now?" If the caller responds, "Yes", the call is transferred. If the caller responds "No", the dialog proceeds to Step 2015. If desired, Step 1600 may include an additional message to request the caller's phone number, so that the dialog may then proceed to Step 1625.

Step 2000 is a Get Information dialog module, performed after the caller responds with a topic in Step 1310 and if the information is too lengthy to be played from a single dialog module. If the information is sufficiently short to be played in a single dialog module, the dialog proceeds directly to Step 2010.

The dialog of Step 2000 first plays a preamble message that corresponds to the topic that was chosen. For example, the message might be: "I have some instructions about how to set up call notes". The next message provides the information to be provided to the caller for the selected topic.

After the message of Step 2000 is played, there are two possible paths for the remaining dialog. If all information has been given, the dialog proceeds to Step 2015. If the information is lengthy, it is spilt into more than one dialog module, and the dialog proceeds to Step 2005.

Step 2005 is a What Next voice menu module. It is performed after the information of Step 2000 has been played to the caller. This step plays a message that gives the caller the option of rehearing the information given in Step 2000 or of going on. An example message is: "Say repeat that or go on".

As indicated above, Step 2010 is a second Get Information dialog module, and plays either the second half of information topics presented in Step 2000 or the entire information for topics that are to be played in one piece. For playing the second half of a topic, Step 2010 is performed after the caller has responded "Go on" after Step 2005. When Step 2010 is used to provide all information.

As indicated in FIG. 4B, at any point during Step 2000 or Step 2010, the caller may speak "Stop". This causes the dialog to branch to Step 2015.

Step 2015 follows Step 2010 and is a second What Next voice menu module. If the caller has entered Step 2015 from Step 2010 and has not said "Stop", the following message is played: "To hear that again, say Repeat That. Otherwise, . . . . ". This provides the caller with an opportunity to hear the information from Step 2010 again.

If the caller does not say "Repeat that", the dialog asks if the caller would like more information about the particular topic selected in Step 1310. If the caller says "Yes", the dialog returns to Step 1310. If the caller says "No", the dialog goes to Step 1050, and continues as explained above.

Step 5000 is a voice menu step, performed when the caller says "I'm finished" during Step 1050. Step 5000 plays a first survey question, such as: "Before you go, I just want to ask you two questions about your satisfaction with this service. First, did I give you the information you were looking for?" If the caller says "Yes", the dialog says "Great" and proceeds to Step 5025. If the caller says "No", the dialog proceeds to Step 5025. In either case, the response is recorded.

Step 5025 is a voice menu step, performed after Step 5000. Step 5025 plays a second survey question, such as: "And rating your experience using this system on a scale from 1 to 5 with 1 being very dissatisfied and 5 being very satisfied, what's my score?". The caller's response is recorded and the dialog goes to Step 9100. By analyzing the recorded results of Steps 5000 and 5010, the system can evaluate its effectiveness.

Step 9100 is a good-by message. A message is played such as: Thanks for calling us. Goodbye". The call is then ended.

The various "Repeat That" messages described above provide the caller with controllable playback, such that the caller may control the pace with which instructions are presented. Also, the division of messages into dialog modules ensures that the caller is not faced with "too much information" at once, and is given adequate opportunity to go back to a previous step or rehear a message of the present step. Each dialog has its own associated timeouts and retries, so that the caller is continually apprised of his or her position in the dialog.

Each of the above-described interactive dialog modules and voice menus includes a "Help" feature. At any time during that dialog module, the caller may say "Help". The dialog then plays a message as specified by that dialog module. The Help feature is particularly useful during Steps 1050, 1075, and 1310, to assist the caller in identifying a topic of interest when the caller does not know the correct name of the service or product or when the caller wishes to browse topics.

Hardware for Implementation

Figure 5:
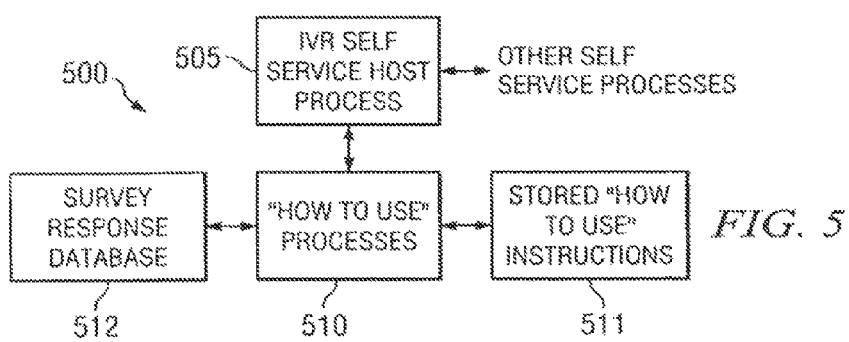
FIG. 5 illustrates a computer system for implementing the method of the invention.

FIG. 5 illustrates a computer system 500 for implementing the dialog interface of FIGS. 4A and 4B. An IVR Self Service Host process 505 is the main process for the system. It controls and passes tasks to various subsystems, one of which is the HTU process 510. Process 510 is programmed to perform the dialog process described above in connection with FIGS. 4A and 4B. A database 511 stores messages and instructions to be played to callers, as described above. A survey database 512 is used to store survey responses collected during the survey steps (Steps 5000 and 5025).

What is claimed is:

1. A call handling method, comprising:
responsive to detecting an opening statement of a caller during a call to a service provider, the service provider comprising a plurality of call centers, determining, based on the opening statement, a caller task including an action and an object;
identifying, based on a first business rule model, a first routing destination for calls to a first call center; and
identifying, based on a second business rule model, a second routing destination for calls to a second call center;
wherein routing destinations are selected from: a call center agent, a queue, a self-service speech recognition application, and the Internet.

2. The method of claim 1, wherein the first call center comprises a how-to-use call center, and wherein identifying the first routing destination includes identifying a how-to-use destination in the how-to-use call center, wherein the how-to-use destination includes:
a plurality of dialog modules activated in response to routing decisions;
a set of verbal prompts; and
a plurality of voice recognition entry points.

3. The method of claim 2, wherein the plurality of call centers includes:
a how-to-use call center;
a billing call center;
a caller retention call center; and
an ordering call center.

4. The method of claim 2, wherein the service provider comprises a telephone service provider and wherein the how-to-use call center includes how-to-use information for telephone services provided by the telephone service provider.

5. The method of claim 1, wherein identifying routing destinations includes identifying destinations based upon an input selected from: speech indicating a name of a product, selection input selecting a topic from a menu, and verbal input describing a feature of the product.

6. The method of claim 1, wherein identifying routing destinations includes:
identifying a direct route destination when the opening statements provide sufficient routing information; and
identifying a clarification destination when the opening statements provide insufficient routing information.

7. The method of claim 1, further comprising:
collecting customer persona data during customer visits to the existing service center; and
determining language alternatives based on the persona data.

8. A computer system, comprising computer hardware programmed to perform operations, the operations comprising:
responsive to detecting an opening statement of a caller during a call to a service provider, the service provider comprising a plurality of call centers, determining, based on the opening statement, a caller task including an action and an object;
identifying, based on a first business rule model, a first routing destination for calls to a first call center; and
identifying, based on a second business rule model, a second routing destination for calls to a second call center;
wherein routing destinations are selected from: a call center agent, a queue, a self-service speech recognition application, and the Internet.

9. The computer system of claim 8, wherein the first call center comprises a how-to-use call center, and wherein identifying the first routing destination includes identifying a how-to-use destination in the how-to-use call center, wherein the how-to-use destination includes:
a plurality of dialog modules activated in response to routing decisions;
a set of verbal prompts; and
a plurality of voice recognition entry points.

10. The computer system of claim 9, wherein the plurality of call centers includes:
a how-to-use call center;
a billing call center;
a caller retention call center; and
an ordering call center.

11. The computer system of claim 9, wherein the service provider comprises a telephone service provider and wherein the how-to-use call center includes how-to-use information for telephone services provided by the telephone service provider.

12. The computer system of claim 8, wherein identifying routing destinations includes identifying destinations based upon an input selected from: speech indicating a name of a product, selection input selecting a topic from a menu, and verbal input describing a feature of the product.

13. The computer system of claim 8, wherein identifying routing destinations includes:
identifying a direct route destination when the opening statements provide sufficient routing information; and
identifying a clarification destination when the opening statements provide insufficient routing information.

14. The computer system of claim 8, wherein the operations include:
collecting customer persona data during customer visits to the existing service center; and
determining language alternatives based on the persona data.

15. Computer hardware including stored program operations, performable by a computer system, wherein the program operations, when performed by the computer system, cause the computer system to perform operations, comprising:
responsive to detecting an opening statement of a caller during a call to a service provider, the service provider comprising a plurality of call centers, determining, based on the opening statement, a caller task including an action and an object;
identifying, based on a first business rule model, a first routing destination for calls to a first call center; and
identifying, based on a second business rule model, a second routing destination for calls to a second call center;
wherein routing destinations are selected from: a call center agent, a queue, a self-service speech recognition application, and the Internet.

16. The computer hardware of claim 15, wherein the first call center comprises a how-to-use call center, and wherein identifying the first routing destination includes identifying a how-to-use destination in the how-to-use call center, wherein the how-to-use destination includes:
a plurality of dialog modules activated in response to routing decisions;
a set of verbal prompts; and
a plurality of voice recognition entry points.

17. The computer hardware of claim 16, wherein the plurality of call centers includes:
a how-to-use call center;
a billing call center;
a caller retention call center; and
an ordering call center.

18. The computer hardware of claim 16, wherein the service provider comprises a telephone service provider and wherein the how-to-use call center includes how-to-use information for telephone services provided by the telephone service provider.

19. The computer hardware of claim 15, wherein identifying routing destinations includes identifying destinations based upon an input selected from: speech indicating a name of a product, selection input selecting a topic from a menu, and verbal input describing a feature of the product.

20. The computer hardware of claim 15, wherein the operations include:
collecting customer persona data during customer visits to the existing service center; and
determining language alternatives based on the persona data.

* * * * *